(12) United States Patent
Kondo et al.

(10) Patent No.: US 11,494,371 B2
(45) Date of Patent: Nov. 8, 2022

(54) COMPUTER SYSTEM AND DATA MANAGEMENT METHOD

(71) Applicant: Hitachi, Ltd., Tokyo (JP)

(72) Inventors: Nobukazu Kondo, Tokyo (JP); Jumpei Okoshi, Tokyo (JP); Kentaro Kakui, Tokyo (JP); Tsunehiko Baba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 17/012,906

(22) Filed: Sep. 4, 2020

(65) Prior Publication Data

US 2021/0124733 A1 Apr. 29, 2021

(30) Foreign Application Priority Data

Oct. 28, 2019 (JP) .............................. JP2019-195112

(51) Int. Cl.
| | |
|---|---|
| *G06F 7/00* | (2006.01) |
| *G06F 16/00* | (2019.01) |
| *G06F 16/23* | (2019.01) |
| *G06F 16/248* | (2019.01) |
| *G06F 16/245* | (2019.01) |

(52) U.S. Cl.
CPC ........ *G06F 16/2379* (2019.01); *G06F 16/245* (2019.01); *G06F 16/248* (2019.01)

(58) Field of Classification Search
CPC ... G06F 16/2379; G06F 16/245; G06F 16/248
USPC ....................................................... 707/740
See application file for complete search history.

(56) References Cited

U.S. PATENT DOCUMENTS

| | | | | |
|---|---|---|---|---|
| 6,650,346 | B1* | 11/2003 | Jaeger | G06Q 10/00 |
| | | | | 715/764 |
| 7,275,063 | B2* | 9/2007 | Horn | G06F 16/22 |
| 7,552,134 | B2* | 6/2009 | Norton | G06Q 10/087 |
| 9,336,399 | B2* | 5/2016 | Milman | H04L 63/20 |
| 10,216,769 | B1* | 2/2019 | Chase | G06Q 10/087 |
| 2002/0184111 | A1* | 12/2002 | Swanson | G06Q 30/06 |
| | | | | 705/26.5 |
| 2005/0177460 | A1* | 8/2005 | Salerno | G06Q 30/0621 |
| | | | | 705/26.5 |
| 2005/0234804 | A1* | 10/2005 | Fang | G06Q 40/04 |
| | | | | 705/37 |
| 2008/0215366 | A1* | 9/2008 | Robson | G16H 40/40 |
| | | | | 705/2 |

(Continued)

FOREIGN PATENT DOCUMENTS

JP 2019-32800 A 2/2019

*Primary Examiner* — Tuan A Pham
(74) *Attorney, Agent, or Firm* — Crowell & Moring LLP (57) ABSTRACT

A computer system manages a data lake storing collected data, which is obtained from a data source, a data catalog storing first catalog data, and an asset catalog storing second catalog data. The computer system comprises: a catalog generation module configured to generate the data catalog, and the asset catalog; and a catalog link generation module configured to associate, in a case where at least one of the data catalog or the asset catalog is generated by the catalog generation module, the asset catalog and the data catalog with each other by adding, as an access key, a value that is stored in the first catalog data stored in the data catalog to the second catalog data stored in the asset catalog.

6 Claims, 5 Drawing Sheets

(56) References Cited

U.S. PATENT DOCUMENTS

| | | | |
|---|---|---|---|
| 2011/0320395 A1* | 12/2011 | Dada | G06Q 30/02 |
| | | | 706/47 |
| 2014/0156464 A1* | 6/2014 | Watanabe | G06Q 30/02 |
| | | | 705/26.61 |
| 2014/0214801 A1* | 7/2014 | Ciliberti, III | G06F 16/284 |
| | | | 707/722 |
| 2014/0244314 A1* | 8/2014 | Donald | G06Q 10/06 |
| | | | 705/4 |
| 2016/0283998 A1* | 9/2016 | Pathak | G06Q 30/0627 |
| 2018/0293587 A1* | 10/2018 | Oda | G06Q 30/06 |
| 2018/0299540 A1* | 10/2018 | Cardno | G01S 5/0278 |
| 2018/0351999 A1* | 12/2018 | Barday | H04L 63/04 |
| 2018/0373956 A1* | 12/2018 | Yamato | H04L 67/12 |
| 2019/0180338 A1* | 6/2019 | Swanson | G06N 3/006 |
| 2020/0166388 A1 | 5/2020 | Naito | |

* cited by examiner

| | 501 | 502 | 503 | 504 142 |
|---|---|---|---|---|
| | ID | GENERATION DATE/TIME | DATA CATALOG VERSION | ASSET CATALOG VERSION |
| | 1 | 2018/01/01 | v 1.0 | v1.0 |
| | 2 | 2018/03/02 | v 1.1 | v1.0 |
| | 3 | 2018/04/11 | v 1.1 | v1.1 |
| | ⋮ | ⋮ | ⋮ | ⋮ |

COMPUTER SYSTEM AND DATA MANAGEMENT METHOD

CLAIM OF PRIORITY

The present application claims priority from Japanese patent application JP 2019-195112 filed on Oct. 28, 2019, the content of which is hereby incorporated by reference into this application.

BACKGROUND OF THE INVENTION

This invention relates to a data management method for data collected with use of an IoT technology.

With an advancement of the Internet of Things (IoT) technology, data collection using a sensor or a similar apparatus, and accumulation, utilization, and the like of the collected data are actively practiced. Utilization of data shared among companies is also becoming active.

The collected data includes data in various formats, for example, structured data and unstructured data, and is therefore accumulated in a data lake. Contents, location, and the like of data accumulated in the data lake are difficult to find out. In a case of using data shared among companies, one company cannot normally find out a structure and the like of data held by another company. Resultant problem is that the accumulated data cannot be used, analyzed, or otherwise processed as it is.

In order to solve this problem, data catalogs for managing the contents, location, and the like of data are being introduced. As a data management method using a data catalog, there has been known a technology described in JP 2019-032800 A.

In JP 2019-032800 A, there is included description "A sensor management unit includes: a sensing data acquisition portion 111 configured to acquire sensing data obtained by a sensor 101 observing a target; a metadata generating portion 112 configured to generate dynamic metadata indicating an attribute of the sensor 101 at a point in time when the sensing data is obtained, the attribute relating to a form of use of the sensor 101 that may dynamically change over time; and a metadata managing portion 114 configured to manage the generated dynamic metadata in association with the sensing data."

SUMMARY OF THE INVENTION

In a case where data obtained from a factory in which a plurality of pieces of equipment are installed is to be used or analyzed, the data is used or analyzed on an equipment-by-equipment basis in many cases. Equipment-based data obtainment is accordingly desired.

It is an object of this invention to provide a system and a method with which equipment-based data obtainment is accomplished.

A representative example of the present invention disclosed in this specification is as follows: a computer system comprises at least one computer including a processor, a storage device coupled to the processor, and a network interface coupled to the processor. The computer system is configured to manage a data lake, a data catalog, and an asset catalog, the data lake storing collected data, which is obtained from a data source, the data catalog storing a plurality of pieces of first catalog data for managing contents and location of the collected data, the asset catalog storing a plurality of pieces of second catalog data for managing a configuration of equipment in a system that serves as the data source and a process that uses the equipment. The computer system comprises: a catalog generation module configured to generate the data catalog based on structure information on the collected data, and generate the asset catalog based on information on the equipment; and a catalog link generation module configured to associate, in a case where at least one of the data catalog or the asset catalog is generated by the catalog generation module, the asset catalog and the data catalog with each other by adding, as an access key, a value that is stored in at least one piece of first catalog data stored in the data catalog to at least one piece of second catalog data stored in the asset catalog.

According to at least one embodiment of this invention, the equipment-based obtainment of desired data can be accomplished. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention. In a configuration of this invention described below, the same or similar components or functions are assigned with the same reference numerals, and a redundant description thereof is omitted here. Notations of, for example, "first", "second", and "third" herein are assigned to distinguish between components, and do not necessarily limit the number or order of those components.

First Embodiment

Figure 1:
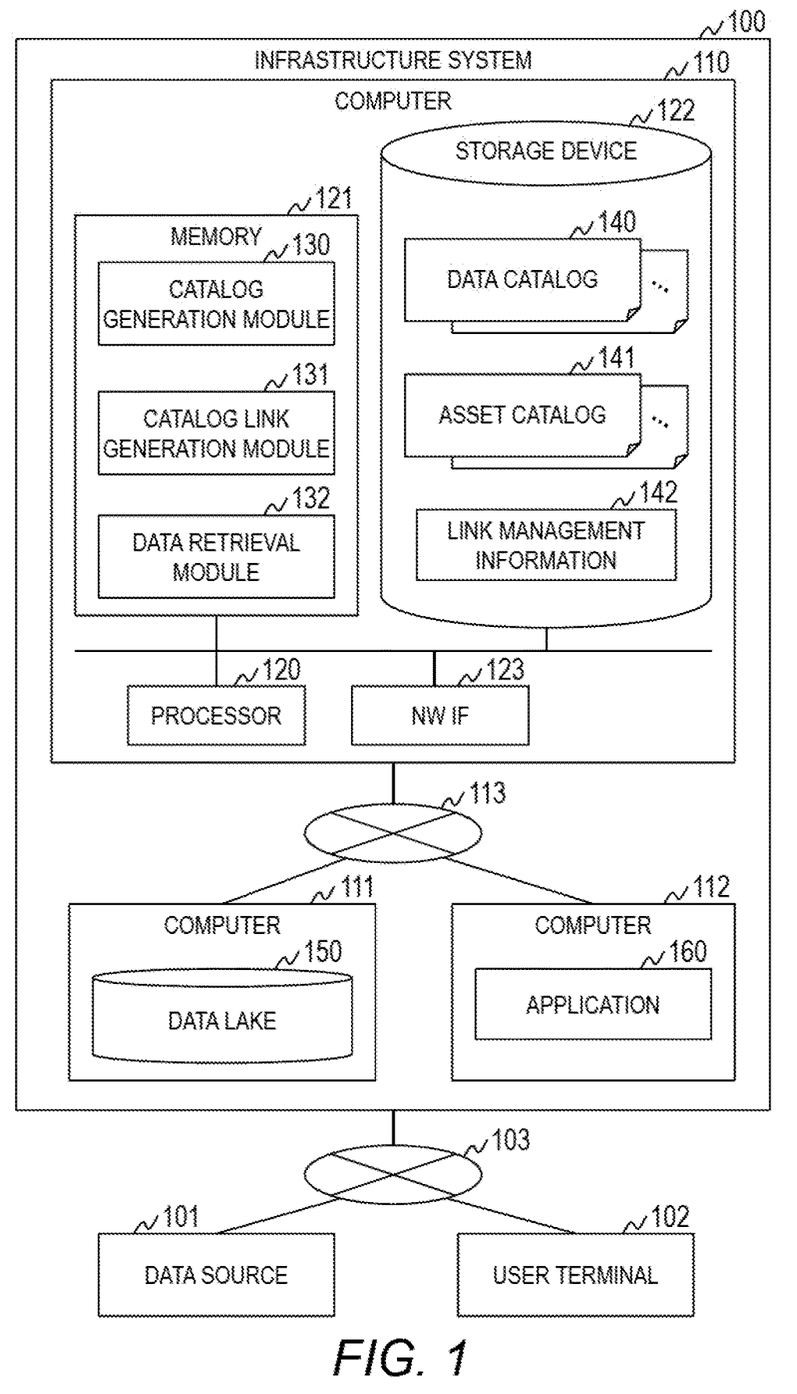
FIG. 1 is a diagram for illustrating a configuration example of a computer system according to a first embodiment of this invention.

FIG. 1 is a diagram for illustrating a configuration example of a computer system according to a first embodiment of this invention.

The computer system includes an infrastructure system 100, a data source 101, and a user terminal 102. The infrastructure system 100, the data source 101, and the user terminal 102 are coupled to one another via a network 103. The network 103 is, for example, a wide area network (WAN) or a local area network (LAN). Wired coupling and wireless coupling are both coupling methods usable for the network 103.

The data source 101 to be included in the computer system and the user terminal 102 to be included in the computer system may be two or more.

The data source 101 is a source from which data is obtained. A factory or a company, for example, serves as the data source 101. In a case where the data source 101 is a factory, operation data of a plurality of pieces of equipment, the factory's environment data, and the like are obtained. The data source 101 may include an edge apparatus configured to execute data aggregation, processing, and the like. In the following description, data obtained from the data source 101 is referred to as "collected data." The collected data may be unprocessed raw data, or data generated by processing raw data.

The user terminal 102 is a terminal for inputting data to the infrastructure system 100 and for obtaining the collected data and others from the infrastructure system 100. The user terminal 102 includes a processor, a memory, a network interface, an input device, and an output device (not shown). Examples of the input device include a keyboard, a mouse, and a touch panel. Examples of the output device include a display and a printer.

The infrastructure system 100 is a system configured to obtain the collected data from the data sources 101 and manage the obtained data. The infrastructure system 100 is also configured to execute, among others, provision of the collected data, and analysis of the collected data.

The infrastructure system 100 includes a plurality of computers, namely, computers 110, 111, and 112. The computers 110, 111, and 112 are coupled to one another via a network 113. The network 113 is, for example, a LAN. Wired coupling and wireless coupling are both coupling methods usable for the network 113.

The computer 111 is a computer configured to manage the collected data obtained from the data sources 101. In the first embodiment, the obtained collected data is stored in a data lake 150. A data structure of the data lake 150 is described with reference to FIG. 2. This invention is not limited by how the obtained collected data is managed.

The computer 112 is a computer configured to execute, among others, the provision of the collected data stored in the data lake 150, and analysis of the collected data. An application 160 configured to execute, among others, the provision of the collected data and analysis of the collected data runs on the computer 112. A plurality of applications 160 may run on the computer 112.

The computer 110 is a computer configured to control access to the collected data stored in the data lake 150. The computer 110 includes a processor 120, a memory 121, a storage device 122, and a network interface 123. The hardware components are coupled to one another via an internal bus. The computer 110 may include an input device and an output device.

The computers 111 and 112 have the same hardware configuration as that of the computer 110.

The processor 120 is configured to execute a program stored in the memory 121. The processor 120 operates as a function module configured to implement a specific function by executing processing as programmed by the program. In the following description, a sentence describing processing with a function module as the subject of the sentence means that a program for implementing the module is executed by the processor 120.

The memory 121 stores programs to be executed by the processor 120 and data to be used by the program. The memory 121 includes a work area to be temporarily used by the programs. The programs stored in the memory 121 are described later.

The storage device 122 is a hard disk drive (HDD), a solid state drive (SSD), or the like, and permanently stores data. The data stored in the storage device 122 is described later.

The program and data stored in the memory 121 may be stored in the storage device 122. In this case, the processor 120 reads the program and the data out of the storage device 122 and loads the read program and data onto the memory 121.

The storage device 122 stores a data catalog 140, an asset catalog 141, and link management information 142.

The data catalog 140 is a catalog for managing the contents, location, and the like of the collected data. The phrase "contents of the collected data" refers to the type, meaning, and the like of a data item, and the phrase "location of the collected data" refers to a place in which the collected data is stored. A data structure of the data catalog 140 is described with reference to FIG. 3.

The asset catalog 141 is a catalog for managing, among others, the configuration of equipment in the data sources 101 and a process executed with the use of the equipment. The phrase "configuration of equipment" refers to, for example, the configuration of a production line for a product, and the term "process" refers to, for example, various processes of production of a product. A data structure of the asset catalog 141 is described with reference to FIG. 4.

In the first embodiment, a plurality of data catalogs 140 in different versions and a plurality of asset catalogs 141 in different versions are stored in the storage device 122. The data catalogs 140 and the asset catalogs 141 may be stored in a storage apparatus coupled to the computer 110.

The link management information 142 is information for managing a pair of one data catalog 140 and one asset catalog 141 that are associated with each other by a catalog link generation module 131. A data structure of the link management information 142 is described with reference to FIG. 5.

The memory 121 is configured to store the programs in order to implement a catalog generation module 130, the catalog link generation module 131, and a data retrieval module 132.

The catalog generation module 130 is configured to generate any one of the data catalog 140 and the asset catalog 141 based on user input.

For example, in a case of receiving a catalog generation request including structure information (metadata) of the collected data, which indicates the contents, location, and the like of the collected data, from the user terminal 102, the catalog generation module 130 generates the data catalog 140 by converting the structure information into XML or other data formats. In a case of receiving a catalog generation request including equipment information (metadata), which indicates the configuration of equipment, a process, and the like, from the user terminal 102, the catalog generation module 130 generates the asset catalog 141 by converting the metadata into XML or other data formats. In the generation of the data catalog 140 and the asset catalog 141, a user operating the computer 110 may add metadata for management.

The catalog link generation module 131 is configured to associate the data catalog 140 and the asset catalog 141 with each other.

The data retrieval module 132 is configured to retrieve the collected data stored in the data lake 150 with the use of the data catalog 140 and the asset catalog 141.

The function modules included in the computer 110 may be a plurality of function modules integrated into a single function module, or may be a single function module divided into a plurality of function modules on a function-by-function basis. For example, the catalog generation module 130 may be divided into a data catalog generation module and an asset catalog generation module.

Figure 2:
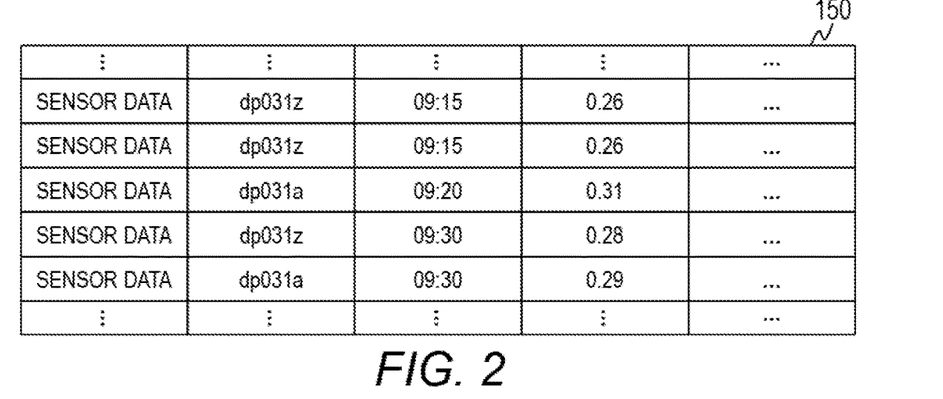
FIG. 2 is a table for showing an example of the data structure of a data lake in the first embodiment.

FIG. 2 is a table for showing an example of the data structure of the data lake 150 in the first embodiment.

The data lake 150 stores entries each including a plurality of fields. The fields of an entry store the type of the collected data, a sensor name, an obtained time, a sensor value, and the like.

This invention is not limited by values stored in the fields. This invention is also not limited by the number of fields included in each entry.

Figure 3:
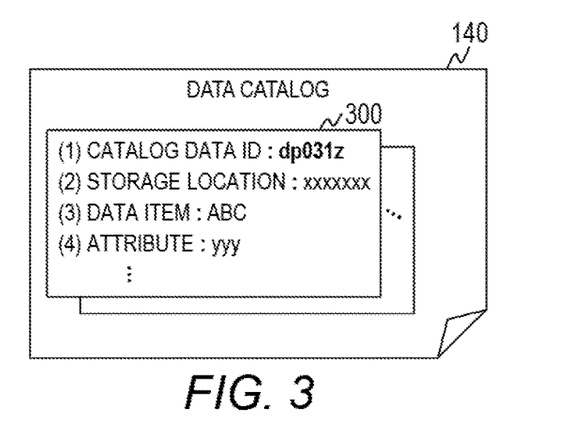
FIG. 3 is a diagram for illustrating an example of the data structure of a data catalog in the first embodiment.

FIG. 3 is a diagram for illustrating an example of the data structure of the data catalog 140 in the first embodiment.

The data catalog 140 stores a plurality of pieces of catalog data 300. The catalog data 300 is data in the XML format. In the following description, the catalog data 300 stored in the data catalog 140 is also referred to as "first catalog data 300."

The first catalog data 300 includes a catalog data ID, a stored location, a data item, an attribute, and others. The catalog data ID is identification information of the first catalog data 300. The stored location is a place in which the collected data is stored. The data item is an item included in the collected data. The attribute is the type of a value of the data item.

The values illustrated in FIG. 3 as values stored in the first catalog data 300 are an example, and the first catalog data 300 is not limited thereto. The first catalog data 300 may be data in an entry format.

Figure 4:
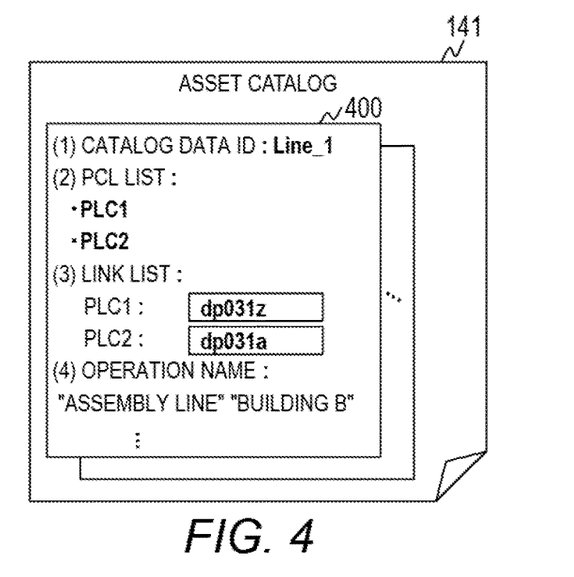
FIG. 4 is a diagram for illustrating an example of the data structure of an asset catalog in the first embodiment.

FIG. 4 is a diagram for illustrating an example of the data structure of the asset catalog 141 in the first embodiment.

The asset catalog 141 stores a plurality of pieces of catalog data 400. The catalog data 400 is data in the XML format. In the following description, the catalog data 400 stored in the asset catalog 141 is also referred to as "second catalog data 400."

The second catalog data 400 includes a catalog data ID, a PLC list, a link list, an operation name, and others. The catalog data ID is identification information of the second catalog data 400. The PLC list is a list of programmable logic controllers (PLCs) configured to control equipment included in a line. The link list is a list of access keys for accessing the first catalog data 300 of the data catalog 140 that is associated with the asset catalog 141. The operation name is the type of a process executed in the line.

The values illustrated in FIG. 4 as values stored in the second catalog data 400 are an example, and the second catalog data 400 is not limited thereto. The second catalog data 400 may be data in an entry format.

Figure 5:
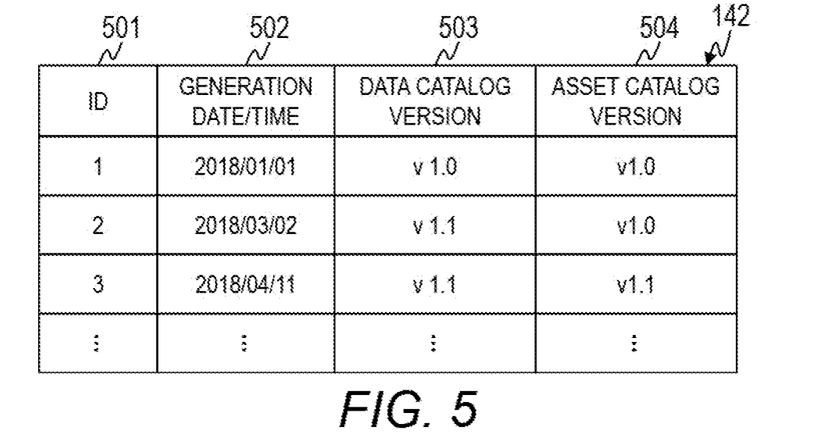
FIG. 5 is a table for showing an example of the data structure of link management information in the first embodiment.

FIG. 5 is a table for showing an example of the data structure of the link management information 142 in the first embodiment.

The link management information 142 stores entries each including an ID 501, a generation date/time 502, a data catalog version 503, and an asset catalog version 504. The link management information 142 has one entry for a pair of one data catalog 140 and one asset catalog 141 that are associated with each other.

A field for the ID 501 stores identification information for identifying an entry of the link management information 142. A field for the generation date/time 502 stores a date and a time at which the data catalog 140 and the asset catalog 141 are associated with each other. A field for the data catalog version 503 stores the version of the data catalog 140. A field for the asset catalog version 504 stores the version of the asset catalog 141.

Figure 6:
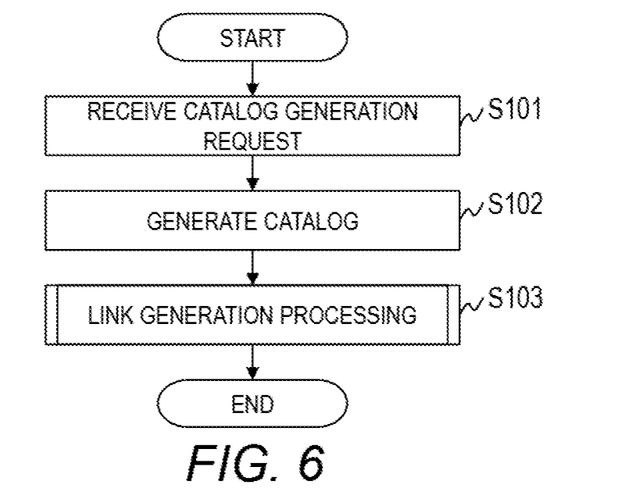
FIG. 6 is a flow chart for illustrating an example of catalog generation processing executed by a computer in the first embodiment.

FIG. 6 is a flow chart for illustrating an example of catalog generation processing executed by the computer 110 in the first embodiment.

The computer 110 receives a catalog generation request from the user terminal 102 (Step S101), and calls up the catalog generation module 130.

The catalog generation module 30 generates at least one of the data catalog 140 and the asset catalog 141 based on the catalog generation request (Step S102). The catalog generation module 130 assigns a version to the generated catalog (the data catalog 140 or the asset catalog 141), and then stores the catalog in the storage device 122. The catalog generation module 130 then calls up the catalog link generation module 131.

The catalog link generation module 131 executes link generation processing in which the data catalog 140 and the asset catalog 141 are associated with each other (Step S103). Details of the link generation processing are described with reference to FIG. 7.

After the link generation processing is executed, the computer 110 ends the catalog generation processing.

Figure 7:
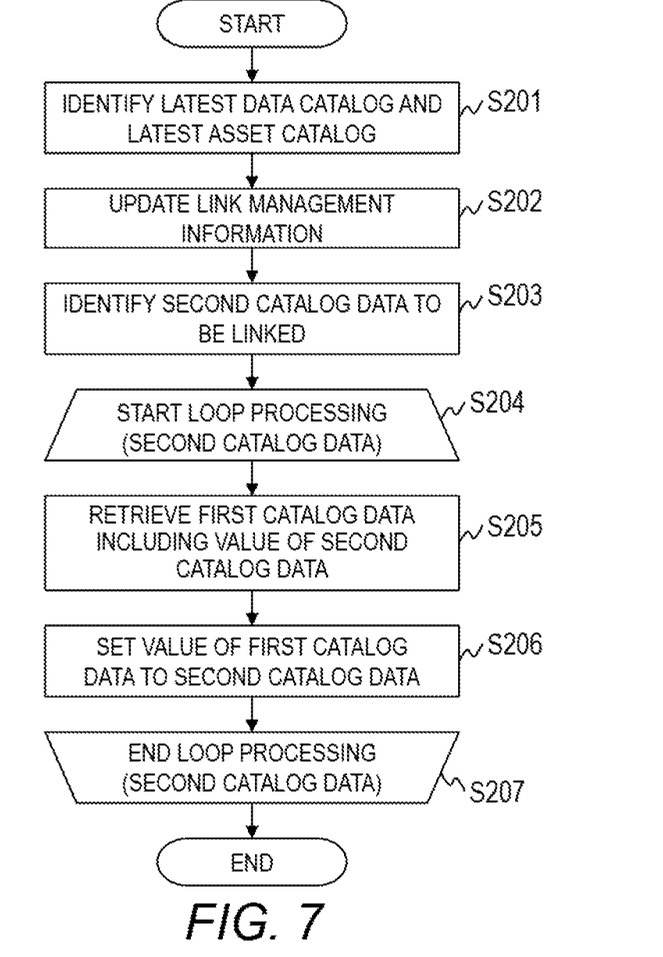
FIG. 7 is a flow chart for illustrating an example of the link generation processing executed by a catalog link generation module in the first embodiment.

FIG. 7 is a flow chart for illustrating an example of the link generation processing executed by the catalog link generation module 131 in the first embodiment.

The catalog link generation module 131 identifies the latest data catalog 140 and asset catalog 141 from the data catalogs 140 and asset catalogs 141 stored in the storage device 122 (Step S201).

Specifically, the catalog link generation module 131 identifies the latest data catalog 140 and asset catalog 141 based on the versions of the data catalog 140 and the asset catalog 141. An alternative method of identification based on the date and time of generation of the data catalog 140 may be used.

Next, the catalog link generation method 131 updates the link management information 142 (Step S202).

Specifically, the catalog link generation module 131 adds an entry to the link management information 142, and stores identification information as the ID 501 of the added entry. The catalog link generation module 131 stores the versions of the identified data catalog 140 and asset catalog 141 as the data catalog version 503 and asset catalog version 504 of the added entry. The catalog link generation module 131 also stores the current date and time as the generation date/time 502 of the added entry.

In the following description, a pair of one data catalog 140 and one asset catalog 141 that are associated with each other is also referred to as "catalog pair."

Next, the catalog link generation module 131 identifies the second catalog data 400 to be linked from pieces of second catalog data 400 that are stored in the identified asset catalog 141 (Step S203), and generates a list of the identified pieces of second catalog data 400.

A value stored in the second catalog data 400 of the asset catalog 141 is determined by the user and is therefore not uniquely determined. For that reason, not all of the pieces of second catalog data 400 may require to be associated with the first catalog data 300. In the first embodiment, pieces of the second catalog data 400 that are to be associated with the first catalog data 300 are accordingly specified. An example of a piece of second catalog data 400 that may possibly be specified as the second catalog data 400 to be linked is a piece of second catalog data 400 that is used to manage the configuration of a line. The specification of the second catalog data 400 may be set in advance, or may be included in the catalog generation request.

Next, the catalog link generation module 131 starts loop processing of the second catalog data 400 to be linked (Step S204).

Specifically, the catalog link generation module 131 selects target second catalog data 400 from the list of the pieces of second catalog data 400.

Next, the catalog link generation module 131 retrieves, from the identified data catalog 140, a piece of first catalog data 300 that is to be associated with the target second catalog data 400 (Step S205). Specifically, the following processing is executed.

(Step S205-1) The catalog link generation module 131 transmits a retrieval request that includes, as a retrieval key, a value included in the target second catalog data 400 to the computer 111. The type of the value used as the retrieval key may be set in advance, or may randomly be set by the catalog link generation module 131. In the first embodiment, a value included in the PLC list is used as the retrieval key.

In a case of receiving the retrieval request, the computer 111 retrieves, from the data lake 150, a piece of collected data that includes a value matching the retrieval key, and transmits the result of the retrieval to the catalog link generation module 131.

(Step S205-2) The catalog link generation module 131 uses, as a retrieval key, the value that is included in the piece of collected data found as a result of the retrieval to refer to the identified data catalog 140, and retrieves a piece of first catalog data 300 that stores a value corresponding to the retrieval key. The type of the value used as the retrieval key may be set in advance, or may randomly be set by the catalog link generation module 131.

This concludes the description of the processing of Step S205.

Next, the catalog link generation module 131 adds, as an access key, to the target second catalog data 400, the value that is stored in the piece of first catalog data 300 found as a result of the retrieval (Step S206).

In the first embodiment, the catalog link generation module 131 adds, as an access key, identification information of the piece of first catalog data 300 found as a result of the retrieval to the link list of the target second catalog data 400. The type of the value used as the access key may be set in advance, or may randomly be set by the catalog link generation module 131.

In a case where a plurality of pieces of first catalog data 300 are found to qualify in the retrieval, the access key of each found piece of first catalog data 300 is stored in the target second catalog data 400.

Next, the catalog link generation module 131 determines whether every piece of second catalog data 400 registered in the list of pieces of second catalog data 400 has been processed (Step S207).

In a case where it is determined that not every piece of second catalog data 400 registered in the list of pieces of second catalog data 400 has been processed, the catalog link generation module 131 returns to Step S204 to execute the same processing.

In a case where it is determined that every piece of second catalog data 400 registered in the list of pieces of second catalog data 400 has been processed, the catalog link generation module 131 ends the link generation processing.

Figure 8:
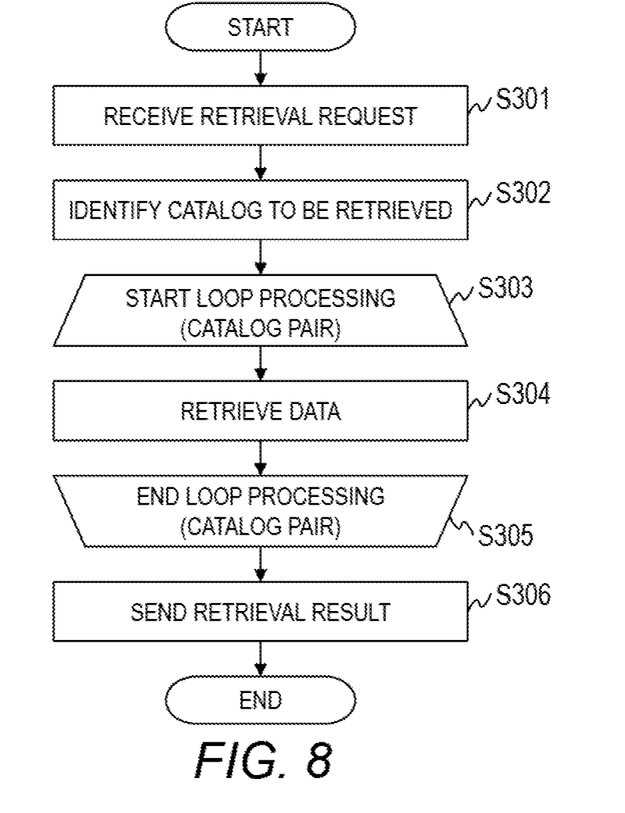
FIG. 8 is a flow chart for illustrating an example of retrieving processing executed by the computer in the first embodiment.
Figure 9:
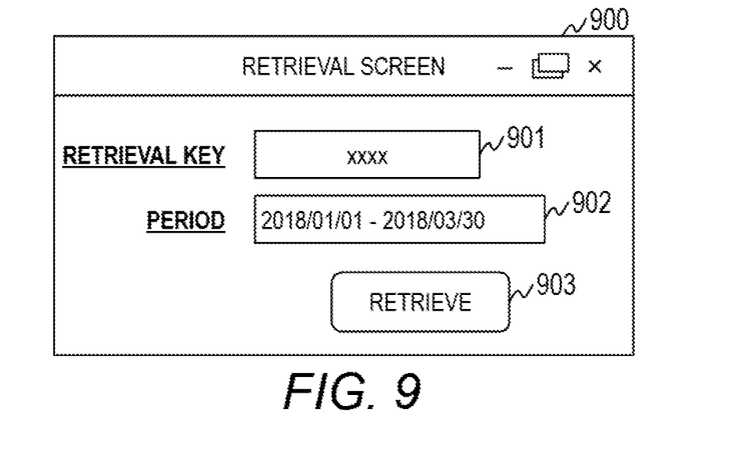
FIG. 9 is a diagram for illustrating an example of a retrieval screen presented by the computer in the first embodiment.

FIG. 8 is a flow chart for illustrating an example of retrieving processing executed by the computer 110 in the first embodiment. FIG. 9 is a diagram for illustrating an example of a retrieval screen presented by the computer 110 in the first embodiment.

Retrieving processing that is executed in a case where a retrieval request including a retrieval key related to equipment is received is described here.

The data retrieval module 132 presents a retrieval screen 900 illustrated in FIG. 9 on the user terminal 102 or in other places. The retrieval screen 900 includes a retrieval key input field 901, a period input field 902, and a retrieval button 903.

The retrieval key input field 901 is a field for inputting a character string, a numerical value, and the like to be used as a retrieval key. In the first embodiment, a retrieval using the asset catalog 141 is discussed and a value stored in the asset catalog 141 is accordingly input in the retrieval key input field 901. For example, the name of a line is input in the retrieval key input field 901. The period input field 902 is a field for inputting a period in which the collected data is obtained (an obtainment period).

The retrieval button 903 is an operation button for issuing an instruction to retrieve. In a case where the user operates the retrieval button 903, the user terminal 102 transmits a retrieval request including the values of the retrieval key input field 901 and the period input field 902 to the computer 110.

The computer 110 receives the retrieval request including the retrieval key and the obtainment period (Step S301), and calls up the data retrieval module 132.

The data retrieval module 132 identifies a catalog pair to be retrieved, based on the link management information 142 (Step S302).

Specifically, the data retrieval module 132 refers to the generation date/time 502 of each entry stored in the link management information 142 to retrieve an entry that has a generation date and time within the obtainment period. Two or more catalog pairs are identified in some cases.

In the retrieval, the data retrieval module 132 may set a retrieval period of a catalog pair based on the obtainment period and the generation date/time 502. For example, in a case where the obtainment period is from 2018 Jan. 1 to 2018 Mar. 30 and the link management information 142 is as shown in FIG. 5, an entry having "1" as the ID 501 and an entry having "2" as the ID 501 (catalog pairs) are identified as catalog pairs to be retrieved. In this case, a period from 2018 Jan. 1 to 2018 Mar. 1 is set as the retrieval period of the catalog pair having "1" as the ID 501, and a period from 2018 Mar. 2 to 2018 Mar. 30 is set as the retrieval period of the catalog pair having "2" as the ID 501.

Next, the data retrieval module 132 starts loop processing of a catalog pair (Step S303).

Specifically, the data retrieval module 132 selects a target catalog pair from the identified catalog pairs.

Next, the data retrieval module 132 retrieves the collected data with the use of the retrieval key included in the retrieval request and the target catalog pair (Step S304). Specifically, the following processing is executed.

(Step S304-1) The data retrieval module 132 refers to the asset catalog 141 to retrieve a piece of second catalog data 400 that stores a value matching the retrieval key.

(Step S304-2) The data retrieval module 132 refers to the data catalog 140 to retrieve a piece of first catalog data 300 that stores a value matching an access key included in the piece of second catalog data 400 found as a result of the retrieval, and that is within the retrieval period (obtainment period).

(Step S304-3) The data retrieval module 132 transmits an obtainment request including a value that is stored in the piece of first catalog data 300 found as a result of the retrieval to the computer 111, to thereby obtain the collected data from the data lake 150.

This concludes the description of the processing of Step S304.

Next, the data retrieval module 132 determines whether the processing has been executed for every identified catalog pair (Step S305).

In a case where it is determined that the processing has not been executed for some of the identified catalog pairs, the data retrieval module 132 returns to Step S303 to execute the same processing.

In a case where it is determined that the processing has been executed for every identified catalog pair, the data retrieval module 132 transmits the results of the retrieval to the user terminal 102 (Step S306), and ends the retrieving processing.

The same processing is executed also in a case where the collected data to be obtained is data that is to be provided or used for analysis.

In a case where there are only one data catalog 140 and one asset catalog 141, the data retrieval module 132 refers to the asset catalog 141 to retrieve a piece of second catalog data 400 that stores a value matching the retrieval key. The data retrieval module 132 refers to the data catalog 140 to retrieve a piece of first catalog data 300 that stores a value matching an access key included in the piece of second catalog data 400 found as a result of the retrieval and that is within the retrieval period. The data retrieval module 132 transmits an obtainment request including a value that is stored in the piece of first catalog data 300 found as a result of the retrieval to the computer 111, to thereby obtain the collected data from the data lake 150.

In a case where a retrieval request including a retrieval key related to the collected data is received, the data retrieval module 132 identifies a catalog pair to be retrieved based on the link management information 142, and executes loop processing of a catalog pair. In this loop processing, the data retrieval module 132 refers to the data catalog 140 to retrieve a piece of first catalog data 300 that includes a value matching the retrieval key.

There is a time lag between an update of equipment and an update of the asset catalog 141. The data retrieval module 132 may accordingly set a period preceding the generation date/time 502 by a fixed length of time as a prohibition period. In this case, the data retrieval module 132 may set a retrieval period so that the prohibition period is excluded from the retrieval period. The data retrieval module 132 may include the prohibition period in the retrieval result. This accomplishes a reduction of errors caused by inconsistency of the collected data and other consequences of the time lag.

According to at least one embodiment of this invention, the following effects are obtained.

(1) The computer 110 in the first embodiment separately manages the data catalog 140 for managing the contents, location, and the like of data and the asset catalog 141 for managing, among others, the configuration of equipment and a process executed with the use of the equipment. The computer 110 also adds, to the second catalog data, an access key for accessing the first catalog data, to thereby manage the asset catalog 141 and the data catalog 140 in association with each other. This enables equipment-based obtainment of desired collected data.

(2) The data catalog of the related art includes information about equipment. The data catalog therefore requires to be newly generated when, although there is no change to the contents, location, and the like of the data, the configuration of the equipment or the like changes. In the generation of a data catalog that takes into account a change to the configuration of the equipment or the like, pieces of meta data varying in the configuration of the equipment are required to be prepared even for pieces of data that have the same contents, which gives rise to a problem of high cost required to set meta data.

The data catalog 140 in the first embodiment is not required to include the configuration of the equipment and the like. It is therefore sufficient to generate the asset catalog 141 alone in a case where the configuration or the like of the equipment changes.

(3) The computer 110 manages the asset catalog 141 generated to accommodate the change to the configuration of the equipment or the like by assigning a version to the generated asset catalog 141. The computer 110 also manages the data catalog 140, the asset catalog 141, and the date and time of generation in association with one another. This accomplishes efficient retrieval for the collected data in chronological order.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, which comprises at least one computer including a processor, a storage device coupled to the processor, and a network interface coupled to the processor,
    the computer system being configured to manage a data lake, a data catalog, and an asset catalog, the data lake storing collected data, which is obtained from a data source, the data catalog storing a plurality of pieces of first catalog data for managing contents and location of the collected data, the asset catalog storing a plurality of pieces of second catalog data for managing a configuration of equipment in a system that serves as the data source and a process that uses the equipment,
    the computer system being configured to manage link management information for managing an association between a version of the asset catalog, a version of the data catalog, and a date and time at which the data catalog and the asset catalog are associated with each other,
    the computer system comprising:
    a catalog generation module configured to generate the data catalog based on structure information on the collected data, and generate the asset catalog based on information on the equipment;
    a catalog link generation module configured to associate, in a case where at least one of the data catalog or the asset catalog is generated by the catalog generation module, the asset catalog and the data catalog with each other by adding, as an access key, a value that is stored in at least one piece of first catalog data stored in the data catalog to at least one piece of second catalog data stored in the asset catalog; and
    a retrieval module configured to retrieve the collected data,
    the retrieval module being configured to:
    refer, in a case of receiving a retrieval request including an obtainment period and a retrieval key for retrieving the collected data via the asset catalog, to the link management information to identify the version of the data catalog and the version of the asset catalog which are associated with the date and time within the obtainment period;
    refer to the asset catalog having the identified version to retrieve a piece of second catalog data that stores a value matching the retrieval key and that stores the access key;
    refer to the data catalog having the identified version to retrieve a piece of first catalog data that stores a value matching the access key stored in the retrieved piece of second catalog data;
    retrieve the collected data stored in the data lake, based on the retrieved piece of first catalog data; and
    send a retrieval result of the collected data in response.

2. The computer system according to claim 1, wherein the catalog link generation module is configured to:
    select target second catalog data from the asset catalog;
    refer to the data lake to identify target collected data, which includes a value stored in the target second catalog data;
    refer to the data catalog to identify a piece of first catalog data that corresponds to the target collected data; and
    add, to the target second catalog data, as the access key, a value stored in the identified piece of first catalog data.

3. The computer system according to claim 2,
    wherein the catalog generation module is configured to:
    assign the version to the asset catalog in a case where the asset catalog is generated; and
    assign the version to the data catalog in a case where the data catalog is generated,
    wherein the catalog link generation module is configured to:
    identify the latest asset catalog and the latest data catalog in a case where at least one of the asset catalog or the data catalog is generated; and
    store, in the link management information, link data that associates the version of the latest asset catalog, the version of the latest data catalog, and a time stamp with one another,
    wherein the target second catalog data is selected from the plurality of pieces of second catalog data that are stored in the latest asset catalog, and
    wherein the piece of first catalog data that corresponds to the target collected data is identified from the plurality of pieces of first catalog data that are stored in the latest data catalog.

4. A data management method to be executed by a computer system, the computer system including at least one computer, which includes a processor, a storage device coupled to the processor, and a network interface coupled to the processor,
    the computer system being configured to manage a data lake, a data catalog, and an asset catalog, the data lake storing collected data, which is obtained from a data source, the data catalog storing a plurality of pieces of first catalog data for managing contents and location of the collected data, the asset catalog storing a plurality of pieces of second catalog data for managing a configuration of equipment in a system that serves as the data source and a process that uses the equipment,
    the computer system being configured to manage link management information for managing an association between a version of the asset catalog, a version of the data catalog, and a date and time at which the data catalog and the asset catalog are associated with each other,
    the data management method including:
    a first step of generating, by the at least one computer, at least one of the data catalog or the asset catalog; and
    a second step of associating, by the at least one computer, in a case where at least one of the data catalog or the asset catalog is generated, the asset catalog and the data catalog with each other by adding, as an access key, a value that is stored in at least one piece of first catalog data stored in the data catalog to at least one piece of second catalog data stored in the asset catalog,
    wherein the first step includes:

generating, by the at least one computer, the data catalog based on structure information on the collected data in a case where the structure information on the collected data is received; and generating, by the at least one computer, the asset catalog based on information on the equipment in a case where the information on the equipment is received;

a third step of referring, by the at least one computer, in a case of receiving a retrieval request including an obtainment period and a retrieval key for retrieving the collected data via the asset catalog, to the link management information to identify the version of the data catalog and the version of the asset catalog which are associated with the date and time within the obtainment period, and to the asset catalog having the identified version to retrieve a piece of second catalog data that stores a value matching the retrieval key and that stores the access key;

a fourth step of referring, by the at least one computer, to the data catalog having the identified version to retrieve a piece of first catalog data that stores a value matching the access key stored in the retrieved piece of second catalog data;

a fifth step of retrieving, by the at least one computer, the collected data stored in the data lake, based on the retrieved piece of first catalog data; and a sixth step of sending, by the at least one computer, a retrieval result of the collected data in response.

5. The data management method according to claim 4, wherein the second step includes:

a seventh step of selecting, by the at least one computer, target second catalog data from the asset catalog;

an eighth step of referring, by the at least one computer, to the data lake to identify target collected data, which includes a value stored in the target second catalog data;

a ninth step of by referring, by the at least one computer, to the data catalog to identify a piece of first catalog data that corresponds to the target collected data; and a tenth step of adding, by the at least one computer, as the access key, a value stored in the identified piece of first catalog data to the target second catalog data.

6. The data management method according to claim 5, wherein the first step includes:

assigning, by the at least one computer, the version to the asset catalog in a case where the asset catalog is generated; and assigning, by the at least one computer, the version to the data catalog in a case where the data catalog is generated, wherein the second step includes:

identifying, by the at least one computer, the latest asset catalog and the latest data catalog in a case where at least one of the asset catalog or the data catalog is generated; and storing, by the at least one computer, in the link management information, link data that associates the version of the latest asset catalog, the version of the latest data catalog, and a time stamp with one another, wherein the seventh step includes selecting, by the at least one computer, the target second catalog data from the latest asset catalog, and wherein the ninth step includes referring, by the at least one computer, to the latest data catalog to identify the piece of first catalog data that corresponds to the target collected data.

* * * * *